United States Patent [19]

Soloy

[11] Patent Number: 4,829,850

[45] Date of Patent: May 16, 1989

[54] MULTIPLE ENGINE DRIVE FOR SINGLE OUTPUT SHAFT AND COMBINING GEARBOX THEREFOR

[75] Inventor: Joe I. Soloy, Centralia, Wash.

[73] Assignee: Soloy Dual Pac, Inc., Olympia, Wash.

[21] Appl. No.: 18,992

[22] Filed: Feb. 25, 1987

[51] Int. Cl.[4] .................. F16H 37/06; F16H 57/02
[52] U.S. Cl. ........................ 74/665 B; 74/661; 74/606 R; 248/554
[58] Field of Search ............... 74/661, 665 A, 665 B, 74/606 R, 665 R, 396, 397, 467, 718; 192/48.92, 48.8; 248/554, 555, 556; 244/54, 53 R, 60

[56] References Cited

U.S. PATENT DOCUMENTS

| | | | |
|---|---|---|---|
| 1,037,710 | 9/1912 | Zimmerman | 74/665 B |
| 2,180,599 | 11/1939 | Menasco | 74/665 B |
| 2,269,916 | 1/1942 | Price | 74/606 R |
| 2,271,163 | 1/1942 | Spencer | 74/606 R |
| 2,297,400 | 9/1942 | Friedrich | 74/661 |
| 2,396,745 | 3/1946 | Nallinger et al. | 60/718 X |
| 2,539,960 | 1/1951 | Marchant et al. | 248/554 |
| 2,647,599 | 8/1953 | Storer, Jr. et al. | 192/48.92 |
| 2,860,713 | 11/1958 | Peterson | 74/661 X |
| 2,893,525 | 7/1959 | McDowall et al. | 192/48.92 |
| 3,011,358 | 12/1961 | Moore | 74/606 R |
| 3,246,538 | 4/1966 | Easton | 74/606 R |
| 3,340,748 | 9/1967 | Young | 74/661 |
| 3,369,230 | 6/1972 | Burkhardt et al. | 192/48.8 |
| 3,782,223 | 1/1974 | Watson | 74/661 |
| 4,022,083 | 5/1977 | Pollak-Banda et al. | 74/665 B |
| 4,106,603 | 8/1978 | Walter | 74/661 X |
| 4,177,693 | 12/1979 | Ivanko | 74/661 |
| 4,481,841 | 11/1984 | Abthoff et al. | 74/665 A |
| 4,531,694 | 7/1985 | Soloy | 244/54 |
| 4,685,550 | 8/1987 | Metcalf | 74/665 B |

FOREIGN PATENT DOCUMENTS

| | | | |
|---|---|---|---|
| 896773 | 3/1945 | France | 74/665 B |
| 1247227 | 9/1971 | United Kingdom | 192/48.92 |

OTHER PUBLICATIONS

Pulication re: Dauphin helicopter SA 365 (undated).
Publication re: Pratt & Whitney Model PW 209T (Information sheet undated).
Publication re: Pratt & Whitney Model PT6 Twin Pac (2 information sheets) (undated).

Primary Examiner—Leslie A. Braun
Assistant Examiner—David Novais
Attorney, Agent, or Firm—Klarquist, Sparkman, Campbell, Leigh & Whinston

[57] ABSTRACT

A dual engine drive system for a single propeller shaft includes a single torque-combining gearbox separated from the engines by gearbox input shafts. The engines, gearbox and propeller shaft are mounted as a unit on a common support frame adapted for installation in existing fixed-wing, single-engine aircraft. Each input shaft drives its own primary gear train within the gearbox. Each gear train includes its own output gear coupled to the propeller shaft through an overrunning clutch. An auxiliary drive train driven by the propeller shaft drives redundant propeller governors, an overspeed governor, and an oil pump for lubricating the propeller shaft and auxiliary gear train. The primary gear trains also drive oil pumps for lubricating their own gearbox sections. The three oil pumps are in separate subcircuits of a common oil circuit, and a mechanism is provided for enabling an operating oil pump of one subcircuit to supply oil to another subcircuit if the oil pump in such other circuit fails.

27 Claims, 8 Drawing Sheets

MULTIPLE ENGINE DRIVE FOR SINGLE OUTPUT SHAFT AND COMBINING GEARBOX THEREFOR

The present invention relates to a multiple engine drive for a single output drive shaft utilizing a torque-combining gearbox. The invention relates especially to a dual engine drive system for a single propeller shaft for fixed wing aircraft and to a gearbox and mounting for such a drive system.

BACKGROUND OF THE INVENTION

Current federal law prohibits the carrying of passengers for hire in single engine propeller-driven fixed wing aircraft. Therefore, propeller-driven commercial passenger airplanes have multiple engines, each driving a propeller. Such aircraft are expensive to purchase, operate, and maintain, especially for the small commercial and charter airlines that typically own such airplanes. Apparently, single engine propeller-driven airplanes are not approved for commercial passenger use because of their perceived unreliability.

Typically, twin engine propeller-driven airplanes mount an engine on each wing because engine configurations offer no reasonable alternative. However, wing-mounted engines reduce aerodynamic efficiency. They also require complex structures and expensive duplicate installations of components and systems. Wing-mounted engines also produce dangerous controllability problems resulting from sudden assymetrical thrust when an engine fails on a heavily loaded airplane.

For many years, helicopters have been permitted by federal law to transport passengers for hire so long as they are equipped with two engines to drive the main rotor shaft. Accordingly, it is believed that a single propeller-driven fixed wing aircraft having two engines available to drive the single propeller shaft should be acceptable under federal law for carrying commercial passengers if such a drive system is reliable and capable of operating on one of two engines if the other fails. Such a drive system would be especially valuable to small charter and commercial airlines if it were adaptable to existing single engine fixed wing aircraft and to existing engines, both turbine and piston driven.

As mentioned above, multiple engine drives for a single helicopter rotor are known. For example, U.S. Pat. No. 4,177,693 to Ivanko discloses the use of three turbine engines to drive the primary power shaft for a main helicopter rotor. The drive from each engine is into a common gearbox but with separate gearbox sections. The input shaft (62) into each input section has splines (64) which drive a gear (66) which drives an idler gear (70) through overrunning clutch (68). Idler gear (70) drives an output gear (78) on a shaft (80) splined to the main power shaft (18). Because the clutch is positioned between the input shaft (62) and the idler gear (70), any failure in any one of the three power trains downstream of its clutch could disable the main power shaft.

Dual engine drives for the main rotor of a helicopter are also known and include the Models PW-209T and PT-6T manufactured by Pratt and Whitney and the Model SA 365 manufactured by Dauphin. However, also such helicopter drive systems are believed to use overrunning clutches in their dual drive trains upstream of the final drive shaft. Therefore such drive systems have the same disadvantages as the Ivanko system.

In addition, multiple engine helicopter rotor shaft drives are not adaptable to fixed wing aircraft, and especially to existing single propeller-driven fixed wing aircraft because of the weight, center of gravity, and configuration constraints of such aircraft and engines suitable for use in such aircraft. For example, typically the multiple-engine helicopter drives described require a torque-combining gearbox directly connected to the engines. Therefore any abnormal torque or shock loading of the rotor is transmitted back to the engines, exposing them to potential damage, especially if they are turbine engines. Also, because of the configuration of a helicopter, the output shaft from the torque-combining gearbox must be coupled to the rotor shaft through a right angle gearbox, further complicating the drive system. However, probably the most serious drawback of such helicopter drive systems is the possibility of rotor malfunction in the event of a failure in any one of the multiple drive trains if that failure occurs downstream of the clutch in such drive train.

The use of multiple engines to drive a common propeller shaft in fixed wing aircraft has also been suggested, for example, as disclosed in U.S. Pat. No. 2,396,745 to Nallinger, et al., and U.S. Pat. No. 3,340,748 to Young. In Nallinger, et al., two engines drive a single propeller shaft through a common gear train. There is a clutch between the output shaft from each engine and the gearbox input pinion shaft from each engine.

In the Young patent, dual aircraft engines (17)(19) drive a single propeller shaft (21) through connection of the engine output shafts to a common gearbox (24) by belt-and-pulley drives. One or both engines drive the single propeller shaft, but the drive is at a different ratio when only one engine is used. The gearbox (FIGS. 5 and 6) includes complex planetary drives in which there are overrunning clutches (74)(71) between the primary input drive sleeves (40) and the primary input drive gears (65) and also between a secondary drive gear (61) and the main gear housing. There is no clutch between the planetary drives and the single propeller shaft (21) or its drive spindles (50).

The Nallinger and Young drive systems have the same drawbacks as the described helicopter drive systems. Any failure in one of the dual drive trains downstream of the clutch in such drive train is likely to disable the propeller shaft.

Dual engine drives for a single output drive shaft have also been suggested for other applications. For example, U.S. Pat. No. 3,669,230 to Burkhardt, et al., discloses a dual engine drive system for a single ship's propeller shaft. Dual engines (1)(1') drive a common drive or propeller shaft (3c) through reduction gearing, including a common output gear (3h) on the propeller shaft and separate pinions (3k) on each input shaft from the engines to the gearbox. A shiftable friction clutch (2) connects each engine output shaft to its gearbox input shaft. However, the Burkhardt system appears to be typical of dual engine drive systems for single output shafts in that the clutching is between the engine output shaft and its gearbox input shaft. Thus, any malfunction in the drive train from one engine downstream of the clutch will disable the final output drive shaft.

U.S. Pat. No. 4,106,603 to Walter discloses a dual engine drive system for a single propeller shaft in which the dual engines (1)(1') drive shafts (7)(7') through flexible couplings (2)(2'). The input shafts (7)(7') extend through hollow shafts (4d)(4'd) and are coupled to such hollow shafts through clutches (3)(3'). The hollow shafts carry gears (4b)(4'b) which drive a common output gear (4a) on the common propeller shaft (5). Thus, the Walter drive system has the same defect as the aforementioned drive systems in that any malfunction in the gear train of one engine downstream of its clutch, such as the gear teeth or gear shaft bearings, is likely to disable the entire drive system, including the propeller shaft.

Known dual engine drive systems for a single output shaft would be unsuitable for existing single propeller-driven fixed wing aircraft, for other reasons as well. Most lack other fail-safe features that would be required to ensure the reliability demanded for such aircraft. For example, the lubrication systems of known multiple engine drive systems are either not adaptable to fixed wing, single propeller-driven aircraft, or lack the built-in redundancies that would be required to ensure safe operation. Although the Ivanko patent suggests the use of independent oil systems for the separate gearbox power sections and the main drive section, the oil system of one section appears to be incapable of taking over for that in another section, if the system in the other section should fail. Furthermore, no suitable means exist for mounting a multiple engine-single propeller-driven system in a fixed wing aircraft. Although U.S. Pat. No. 4,531,694 to Soloy discloses a mounting system for mounting a single engine and separate gearbox as a unit in a single-engine fixed wing aircraft, it is not adapted for multiple engine-single gearbox-single propeller applications.

Aircraft and aircraft engines come in various sizes and configurations. Therefore, with known such drive systems it would also be necessary to design a different gearbox for each different configuration of aircraft and each different configuration of aircraft engine, a prodigious task.

Accordingly, there is a need for a multiple engine drive system for a single propeller shaft suitable for fixed wing aircraft use and for a gearbox and a mounting system for such a drive system.

SUMMARY OF THE INVENTION

The present invention is a multiple engine drive system for a single propeller shaft, especially suitable for use in fixed wing aircraft. The system includes a unique torque-combining gearbox adaptable to various aircraft and engine configurations. The invention further includes a unique mounting system for aircraft mounting of the drive system, including engines, gearbox and propeller shaft, as a unit in existing aircraft.

The drive system features separate drive trains from each engine to the final drive or propeller shaft. Each separate drive train includes a separate output gear on the propeller shaft. Each output gear is drivingly coupled to the propeller shaft by an overrunning clutch such that any malfunction in a drive train from one engine does not disable the drive train from any other engine or the propeller shaft itself.

Another feature of the preferred embodiment of the invention is a torque-combining gearbox having a separate power input-output section for each engine and its associated gear train. The input-output sections are rotatable relative to one another about the axis of the propeller shaft to accommodate different aircraft, engine and mounting configurations.

Still another feature of the preferred embodiment of gearbox is a separate gear train for each input shaft, each such gear train including an input gear on input pinion shaft, an idler gear, and an output drive gear on the propeller shaft and coupled to it by an overrunning clutch. The pinion shaft may be hollow, with the input shaft extending through the hollow pinion shaft and flexibly coupled to it.

The gearbox may include an oil system with fail-safe features including independently operable oil systems, including separate oil pumps for each power input-output section and the propeller shaft auxiliary gearbox section of the gearbox. The oil pumps for the power input-output sections are driven by their respective drive trains, and the oil pump for the propeller shaft auxiliary gearbox section is driven by an auxiliary drive train from the propeller shaft. Each oil pump preferably has the capacity and the means for supplying oil under proper pressure to its own gearbox section and also to another gearbox section in the event of an oil pump failure in such other section. Automatic switching to another pump may be provided in the event of failure of the propeller shaft-driven pump.

The gearbox may also include redundant propeller speed governors in the auxiliary gearbox section, with one automatically operable in the event of a malfunction of the other. An overspeed governor may be provided to prevent propeller runaway during malfunction of the propeller governors.

In the preferred embodiment, the dual engines and independent combining gearbox may be mounted separately to a common truss-like mounting frame, featuring a common support frame ring. Such ring in turn is flexibly mounted to the air frame to mount the drive system as a unit in an aircraft. Flexible coupling of the dual engines to their respective gear trains in a separate gearbox ensures that excessive torque or shock loading at the gearbox will not be transmitted back to the engines.

Primary objectives of the present invention include:
1. a multiple engine-single output shaft drive system that is unusually fail-safe;
2. a dual engine drive system for a single propeller shaft especially suitable for use in fixed wing aircraft;
3. a torque-combining gearbox for a dual engine-single propeller drive system for fixed wing aircraft enabling the selective use of one or both engines to drive the propeller shaft;
4. A dual drive system as aforesaid which will not disable the propeller shaft if one engine or any part of its associated drive train fails;
5. a multiple engine drive system as aforesaid having built-in power plant, drive train, oil system, and propeller speed governing redundancies for fail-safe operation;
6. a mounting means for a dual engine drive system as aforesaid adapted to mount such system as a unit in a propeller driven aircraft;
7. a torque-combining gearbox for a dual engine drive system as aforesaid which is flexible and adaptable for use with a wide variety of aircraft, engine and mounting configurations;
8. a multiple engine drive system as aforesaid capable of employing multiple engines having different power ratings; and
9. a multiple engine drive and mounting system as aforesaid especially adapted for nose mounting in existing single propeller-driven aircraft.

The foregoing and other objects, features, and advantages of the present invention will become more apparent from the following detailed description which proceeds with reference to the accompanying drawings.

DETAILED DESCRIPTION OF A PREFERRED EMBODIMENT

General Arrangement

Figure 1:
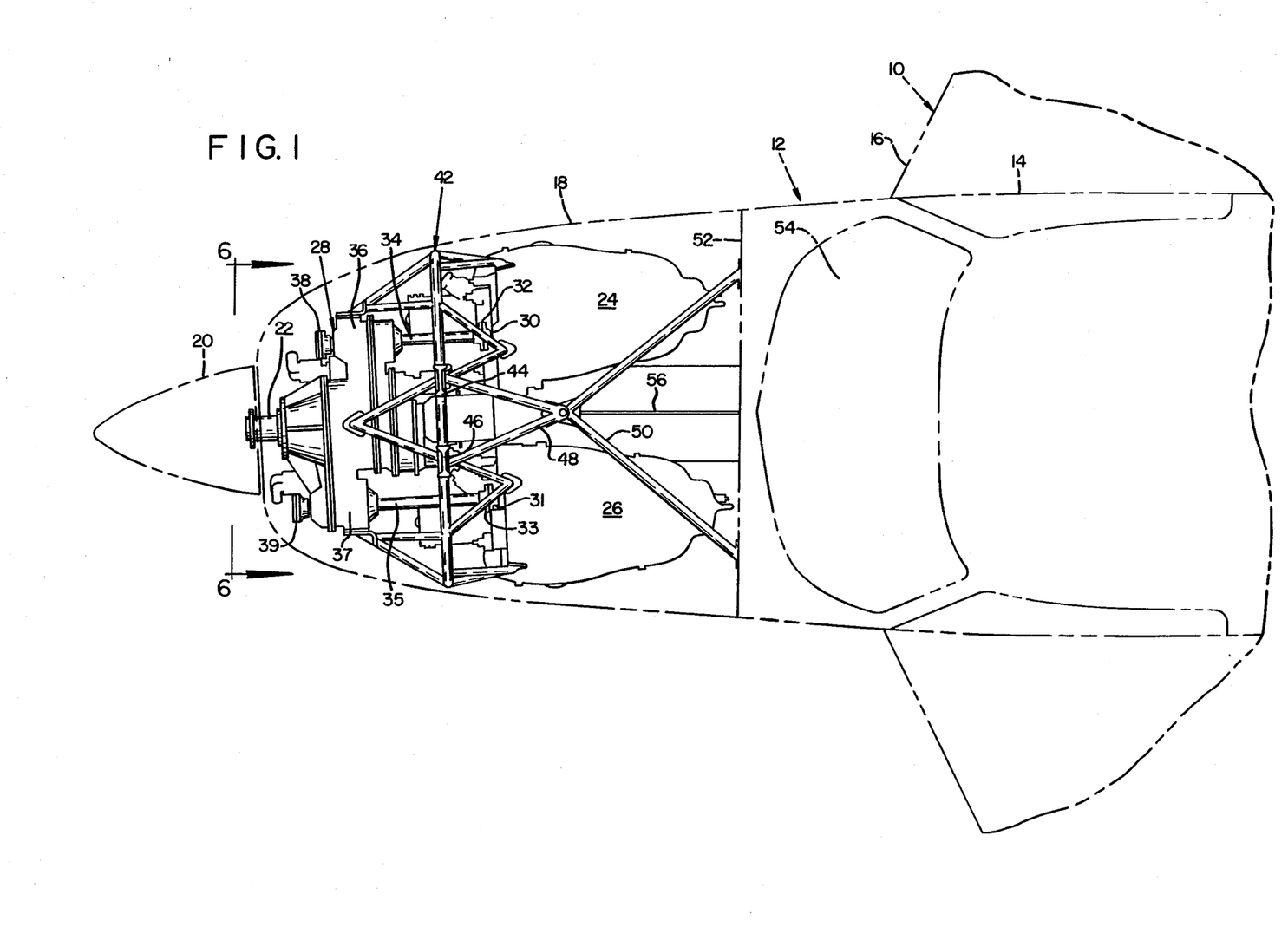
FIG. 1 is a schematic partial top plan, partially cutaway view of the forward portion of a typical single engine, fixed wing aircraft showing the drive and mounting system of the invention in the nose portion of the aircraft.

Referring to FIG. 1, an airplane 10 includes an air frame 12 having a fuselage 14 supporting a fixed wing 16 behind a nose portion 18 of the fuselage. The airplane is driven by a single propeller carried by a spinner 20 mounted on a propeller shaft 22 at the forward end of nose portion 18. The aircraft as described thus far is of conventional construction.

Within the nose portion of the fuselage, a pair of side-by-side mounted turboshaft gas turbine engines 24,26 drive the single propeller shaft 22 through a common gearbox 28. Engines 24,26 include engine output shafts 30,31 coupled by flexible couplings 32,33 to gearbox input shafts 34,35. The input shafts extend through their respective power input-output sections 36,37 of gearbox 28 and are coupled at flexible couplings 38,39 to respective gear trains (FIGS. 4 and 5) within the gearbox housing. These gear trains drivingly couple the input shafts to the common propeller shaft 22 through respective overrunning clutch means at the propeller shaft.

A truss-like support frame 42 mounts the described drive system as a unit, including the two engines 24,26, independent torque-combining gearbox 28, and propeller shaft 22, as a unit within nose section 18 of the fuselage. More particularly, support frame 42 is flexibly mounted by mounting brackets 44,46 and associated resilient pads to triangular truss struts 48,50. These struts connect the support frame to a transverse fire wall 52 of the air frame separating the nose section from the cabin section 54 of the aircraft. A longitudinal fire wall 56 separates the two engines to protect them from one another in the event of a fire or compressor blade failure in one.

Drive System Mounting Frame

Figure 2:
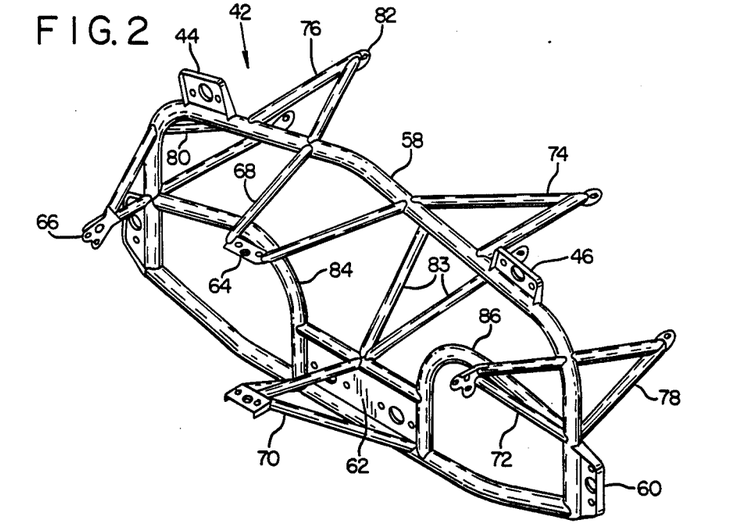
FIG. 2 is a perspective view of the mounting frame portion of the drive system shown in FIG. 1.

Referring to FIG. 2, the drive system support frame 42 includes a generally annular but transversely oblong tubular frame ring 58. The ring is resiliently mounted by the previously described top mounting brackets 44,46, side mounting brackets 60 and bottom mounting brackets 62 and their associated resilient isolator pads (not shown) to the transverse fire wall 52 of the air frame by support struts 48,50 (FIG. 1) and additional such struts similar to struts 48,50. Generally triangular tubular gearbox mounting struts affixed to frame ring 58 extend forwardly from the ring. They terminate at their forward ends at mounting plates 64,66 for rigidly fastening the gearbox 28 to the frame ring 58. Such gearbox mounting struts include a top strut 68, a bottom strut 70, and a pair of opposite side struts 72.

In a similar fashion, generally triangular tubular engine mounting struts rigidly affixed to the frame ring extend rearwardly from the ring to mount the two engines 24,26 to the ring. Such engine mounting struts include a pair of top mounting struts 74,76 and a pair of opposite side mounting struts 78,80. One strut of each such pair is connected to one engine and the other strut is connected to the other engine by mounting plates 82. In addition, a pair of single-tube struts 83 project rearward from the central bottom portion of ring 58 for connection to the insides of engines 24,26.

Because of its size and strength requirements, frame ring 58 is reinforced by tubular gusset members 84,86 extending from mid-portions of the bottom run of the frame ring to mid-portions of the opposite side runs of the frame ring. These gussets provide openings through which engine air intake ducts can extend.

The described mounting system has many of the same advantages for the described dual engine drive system as described for single-engine systems in U.S. Pat. No. 4,531,694 to Soloy. In essence, the frame ring mounts the entire drive system as a unit in the aircraft, facilitating the conversion of existing single engine fixed wing aircraft to dual engine drive. The frame ring resiliently mounts the drive system to the air frame of the aircraft, isolating the airframe from vibration. The dual engines and separate gearbox are suspended independently from the frame ring. The gearbox is also isolated from the engines by flexible couplings. Therefore any shock loading of the gearbox is transmitted directly to the frame ring and through the flexible frame ring mountings to the air frame rather than to the engines, thereby minimizing the potential for engine damage from propeller strikes and other excessive torque loads. This is an especially important consideration in turbine engine drive systems because of the expense of repairing such engines.

Gearbox Construction

Referring to FIGS. 3, 5, 9, and 10, gearbox 28 is divided generally into three main functional sections, including a port side drive train gearbox section 88, a starboard side drive train gearbox section 90 and a propeller shaft gearbox section 92. Additionally, at the rear of the gearbox is an auxiliary gearbox section 93 housing an auxiliary drive train 110. The auxiliary gearbox section, functionally, is a subsection of the propeller shaft section and shares a common oil system. The propeller shaft and drive train sections have their oil systems isolated from one another to prevent cross contamination of their respective oil supplies if a drive train section should fail.

Figure 3:
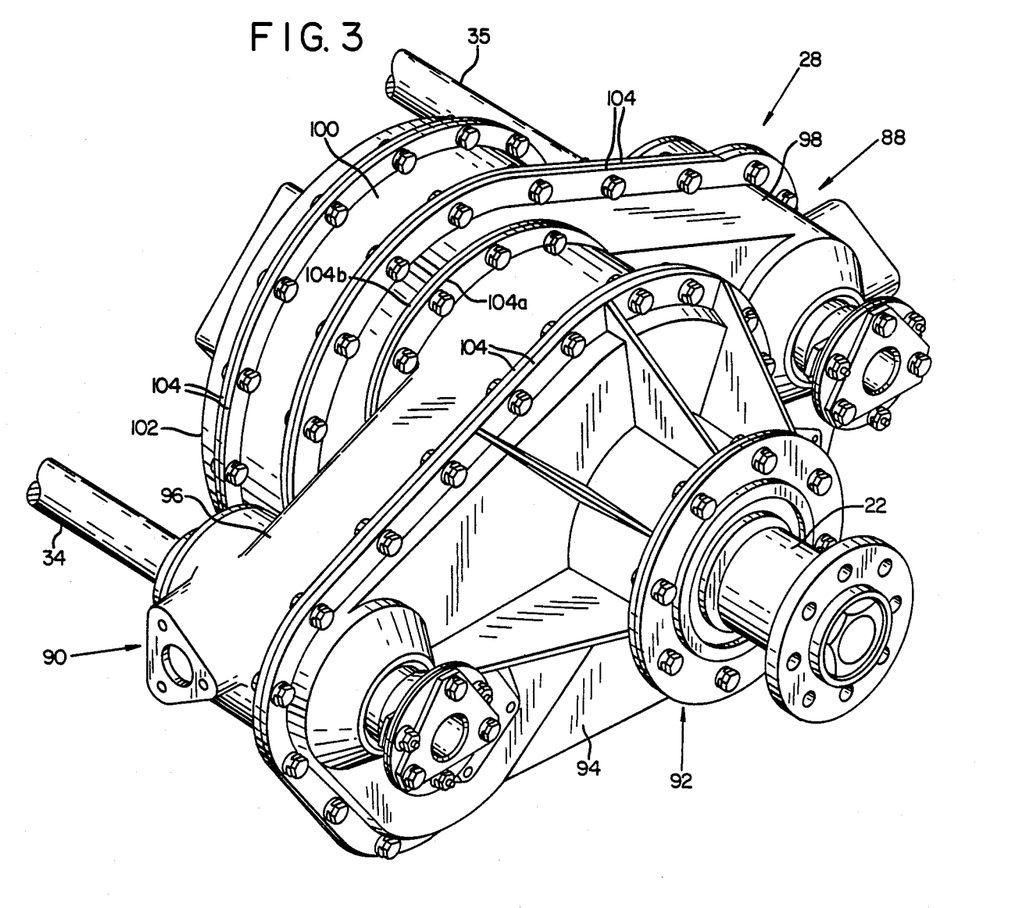
FIG. 3 is a perspective view of the torque-combining gearbox portion of the drive system shown in FIG. 1.

The gearbox housing itself is subdivided into five bolted-together flanged sections. Proceeding from front to back, these include a front cover section 94 bolted to a first intermediate section 96. Together these sections house a forward portion of propeller shaft 22 and a first gear train making up the starboard side drive train section 90. First intermediate housing section 96 is bolted to a second intermediate housing section 98 which in turn is bolted to a third intermediate housing section 100. Housing sections 98,100 house a rear portion of the propeller shaft 22 and a second gear train making up the port side drive train section 88. A rear cover section 102 is bolted to housing section 100. Together they house the rearmost portion of the propeller shaft and make up the auxiliary gearbox section 93 housing auxiliary drive train 110 driven off the propeller shaft. The various housing sections are bolted together at flanges 104.

The mating flanges 104a,104b joining the first and second intermediate housing sections are circular, enabling the port and starboard drive train sections to be rotated relative to one another about the axis of propeller shaft 22 before they are bolted together. Thus, by rotating such gearbox sections and their associated input gear trains about the propeller shaft during assembly, adjustment of the spacing between input shafts 34,35 and positioning of such shafts relative to the propeller shaft can be adjusted to accommodate different fuselage, engine, and engine mounting configurations in a manner to be described in greater detail with respect to FIGS. 6 and 7.

Figure 4:
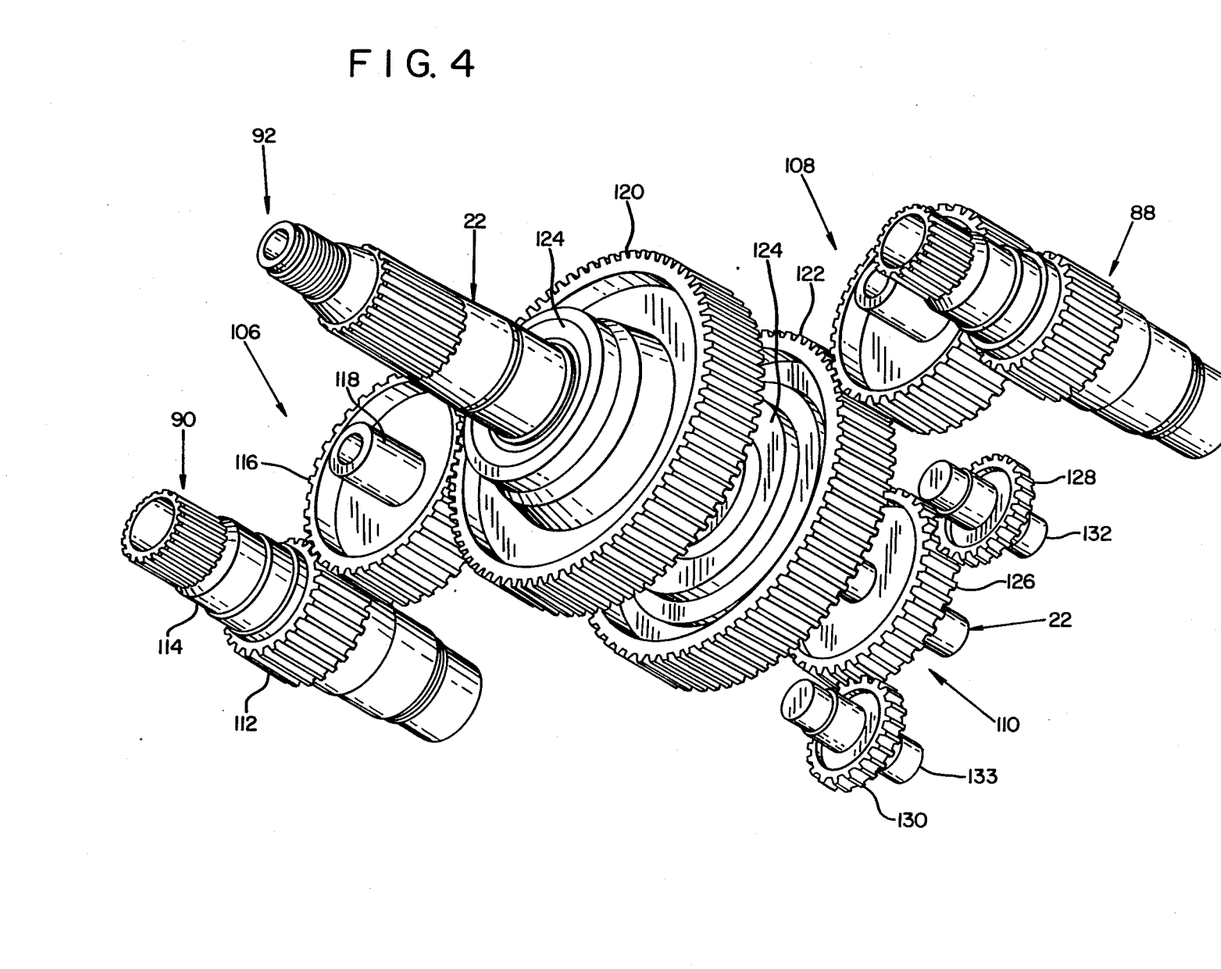
FIG. 4 is a perspective view of the various gear trains within the gearbox of FIG. 3.
Figure 5:
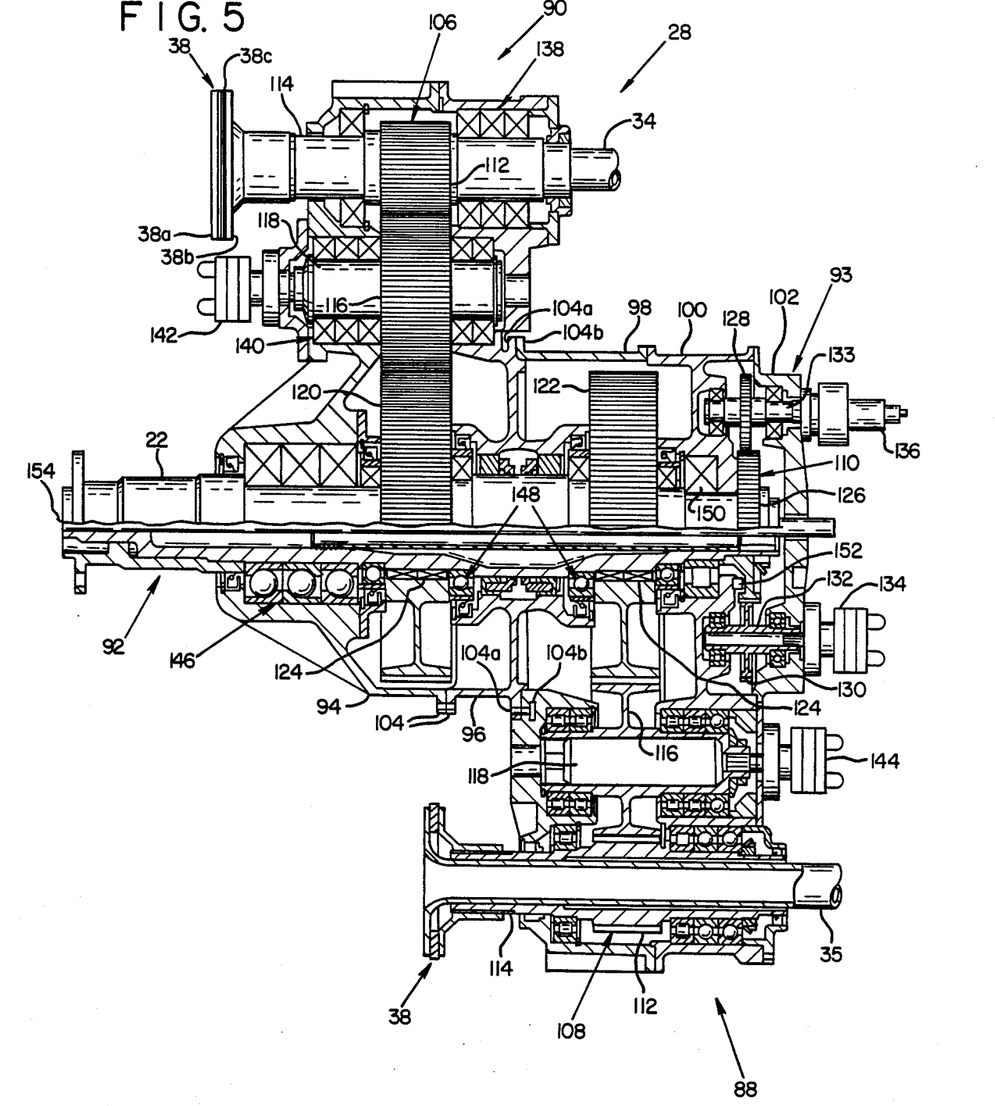
FIG. 5 is an axial sectional view of the gearbox of FIG. 3 taken through the axes of the input shafts and propeller shaft.

Referring to the interior of the gearbox as shown in FIGS. 4 and 5, it comprises essentially three different gear trains. These include a first primary gear train 106 in the starboard drive train section 90 of the gearbox, a second primary gear train 108 in the port side drive train section of the gearbox, and an auxiliary drive train 110 driven off propeller shaft 22 in the auxiliary gearbox section 93.

Referring to the starboard side primary gear train, each primary gear train includes an input pinion gear 112 carried by a hollow pinion shaft 114, an intermediate idler gear 116 carried on an idler shaft 118, and a larger output gear 120 carried on the final drive or propeller shaft 22. The other input gear train 108 is identical and includes a second output gear 122 on propeller shaft 22. Preferably the individual gears of both primary gear trains are of the same size.

Output gears 120,122 are mounted on the propeller shaft by overrunning clutches 124. These clutches may be of the sprag type such as the Formsprag brand clutches. The overrunning clutches ensure that output gears 120,122 will "free wheel" on the propeller shaft unless driven by their respective primary gear trains at speeds at least as great as the speed of rotation of the propeller shaft. Thus, if engine 24 driving gear train 106 should shut down while engine 26 driving gear train 108 continues to operate, gear train 108 will continue to drive propeller shaft 22 through its output gear 122 while output gear 120 free wheels on the propeller shaft.

Auxiliary gear train 110 includes an auxiliary drive gear 126 fixed to propeller shaft 22. Various auxiliary spur gears 128,130 mounted respectively on shafts 132,133 drive various gearbox accessories including an oil pump 134 for lubricating the propeller shaft and an overspeed governor 136. Various other accessories can also be driven off of the auxiliary drive gear through other appropriate spur gearing (not shown), including primary and backup propeller speed governors (FIG. 5).

Each primary gear train is driven from its associated engine 24,26 as follows: Input shafts 34,35 extend all the way through their respective hollow pinion shafts 114 and are connected to their respective pinion shafts at their free forward ends by a flanged flexible coupling 38,39 of the so-called "Thomas" type as manufactured by Rexnord, Inc., of Warren, Pa. With reference to coupling 38, each such coupling includes a first flange 38a connected to the input shaft, a second flange 38b connected to the pinion shaft, and stainless steel lamina 38c interposed between the two interconnected flanges to permit a flexing of the input shaft through up to 0.75°.

Of course, pinion shaft 114 is mounted in suitable bearings 138. Pinion gear 112 meshes with idler gear 116 on idler shaft 118. Idler shaft 118 is mounted in suitable bearings 140. The idler shaft 118 of each gear train drives its own oil pump 142,144, respectively, for lubricating its own gearbox section. However, as will be explained in more detail later, if either oil pump 142 or oil pump 144 fails during operation of both engines, the still-operating pump can be switched manually to lubricate both gearbox drive sections, and each pump has sufficient capacity to accomplish this. Similarly, if propeller shaft gear pump 134 fails during operation of either engine, the operating idler-driven oil pumps 142,144 will automatically supply oil under suitable pressure to the propeller shaft bearings and auxiliary gear train.

As previously explained, the idler gear 116 of each primary gear train meshes with the main output drive gears 120,122 on propeller shaft 22. However, their respective overrunning clutches 124 prevent driving engagement of the output gears 120,122 with the propeller shaft unless such gears are driven by their respective engines at a speed matching the speed of the propeller shaft.

Propeller shaft 22 is mounted in a stack of three angular thrust bearings 146 and in ball and roller bearings 148,150. Also, a bronze ring 152 provided on an aft portion of the housing is adapted to co-act with the auxiliary drive gear 110 to carry the thrust load of the propeller shaft if the primary thrust-carrying bearings 146 should fail.

Adjustable Gearbox Configuration

An important feature of the gearbox of the present invention is its adjustable configuration to accommodate different fuselage, engine, and engine mounting configurations. For this purpose, the two power train sections 88,90 of the gearbox have respective housing sections 96,98 bolted at circular flanges 104a,104b. The spacing between bolt holes on both flanges are the same and can therefore be matched at different relative positions of the flanges, enabling relative rotation of the two power sections 88,90 about the axis of the propeller shaft 22. Of course, this includes rotation of primary gear trains 106,108 about the propeller shaft 22.

Figure 6:
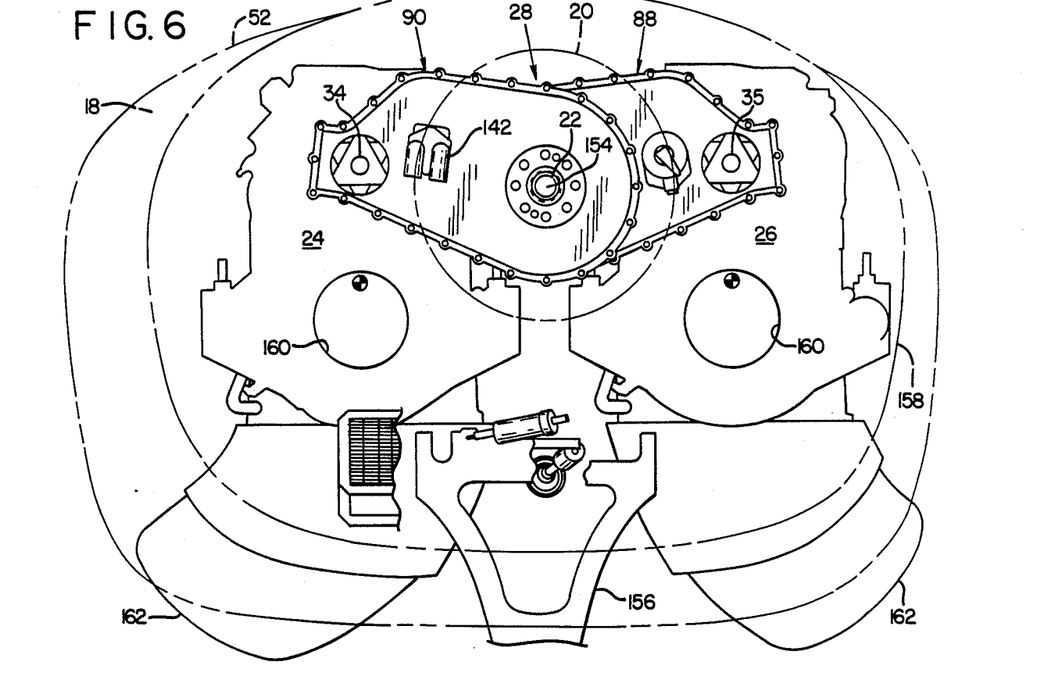
FIG. 6 is a front elevational view of the drive system as viewed approximately from the line 6—6 of FIG. 1, but omitting the mounting frame for clarity.

Referring first to FIG. 6, the fuselage nose configuration 18 and fire wall configuration 52 is typical for a Cessna Caravan airplane. Engines 24,26 have the profiles of an Allison 250-C30 turboshaft gas turbine engine. Their engine output shafts and thus the aligned gearbox input shafts 34,35 are positioned relatively high on the engine profiles on opposite sides of the axis 154 of propeller shaft 22. The axes of the input shafts 34,35 are actually positioned above the axis 154 of the propeller shaft 122. The existing nose landing gear 156 is also shown, as well as the cowl contour 158 for the Cessna Caravan, the engine air compresser inlets 160, and the engine exhaust gas outlets 162.

Figure 7:
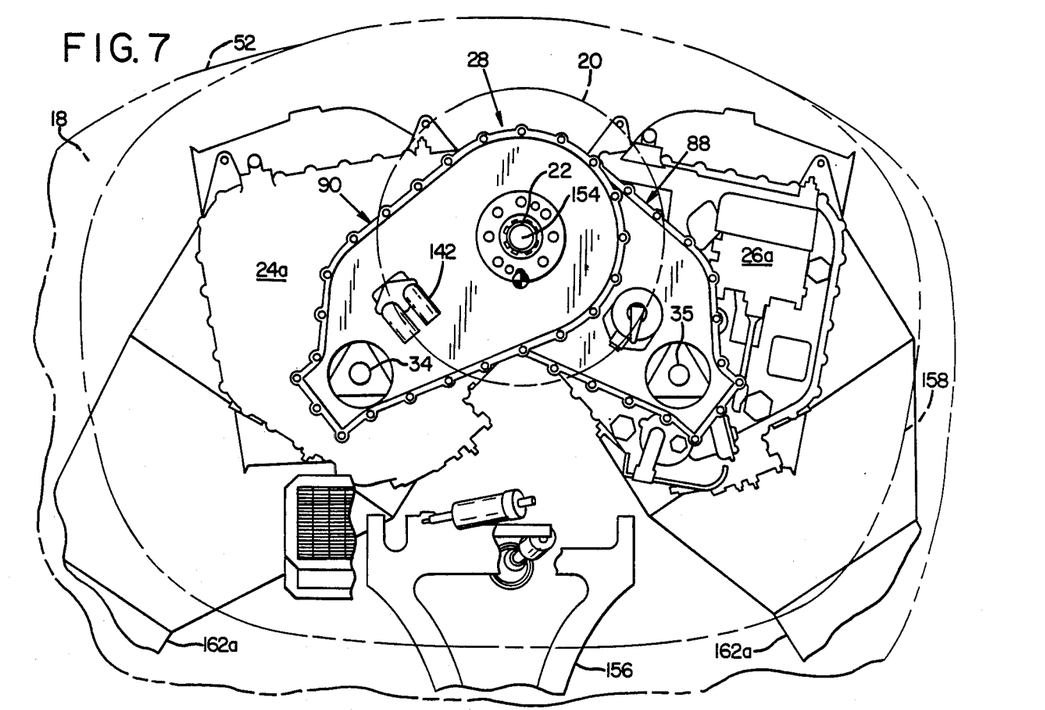
FIG. 7 is a view similar to FIG. 6 but showing certain sections of the torque-combining gearbox assembled in a different orientation than shown in FIG. 6 to accommodate a different engine configuration.
Figure 8:
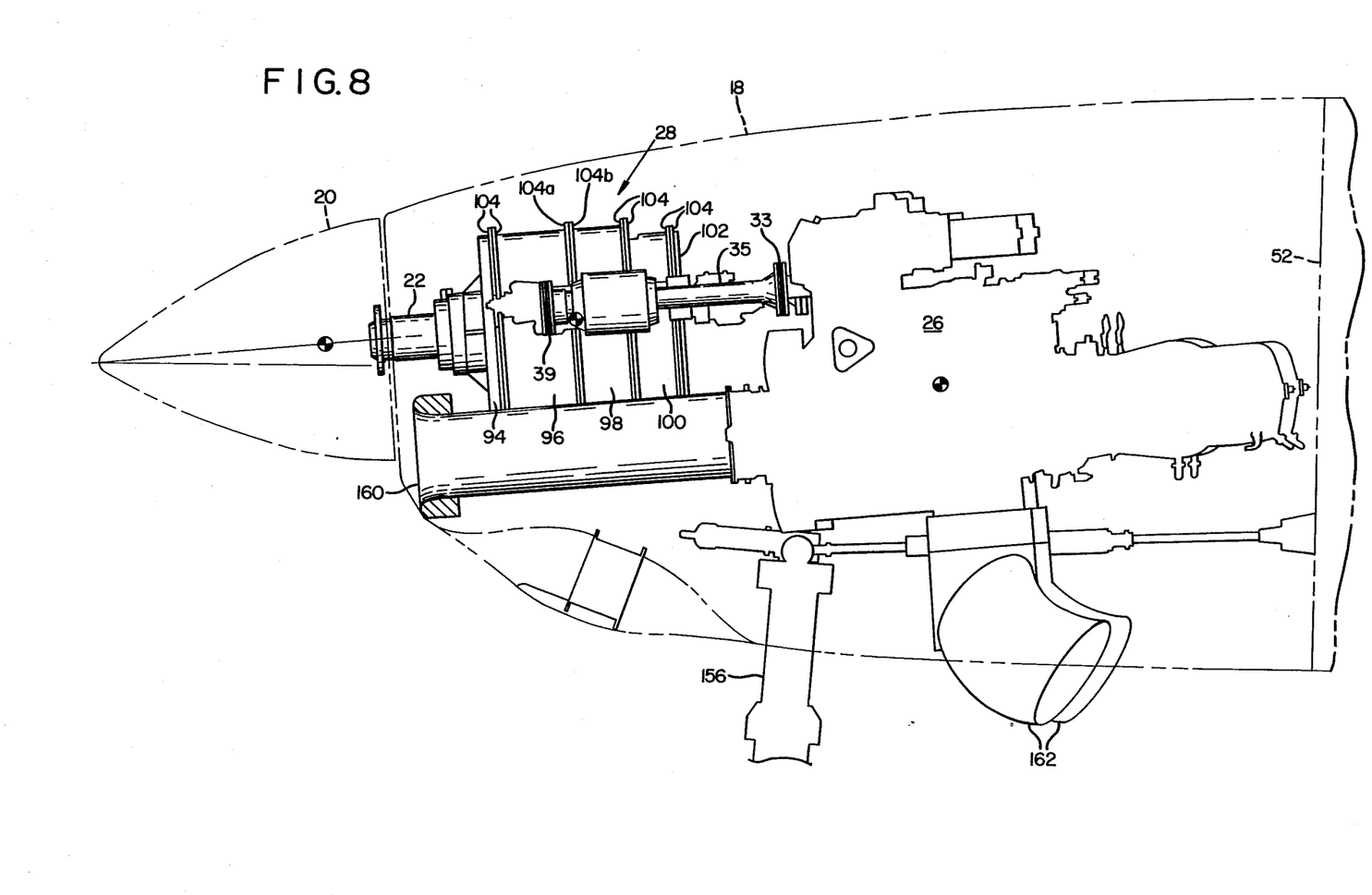
FIG. 8 is a schematic partial elevational view of the interior nose portion of the aircraft of FIG. 1 on an enlarged scale and omitting the mounting frame to the drive system of the invention and especially its gearbox housing in greater detail.
Figure 9:
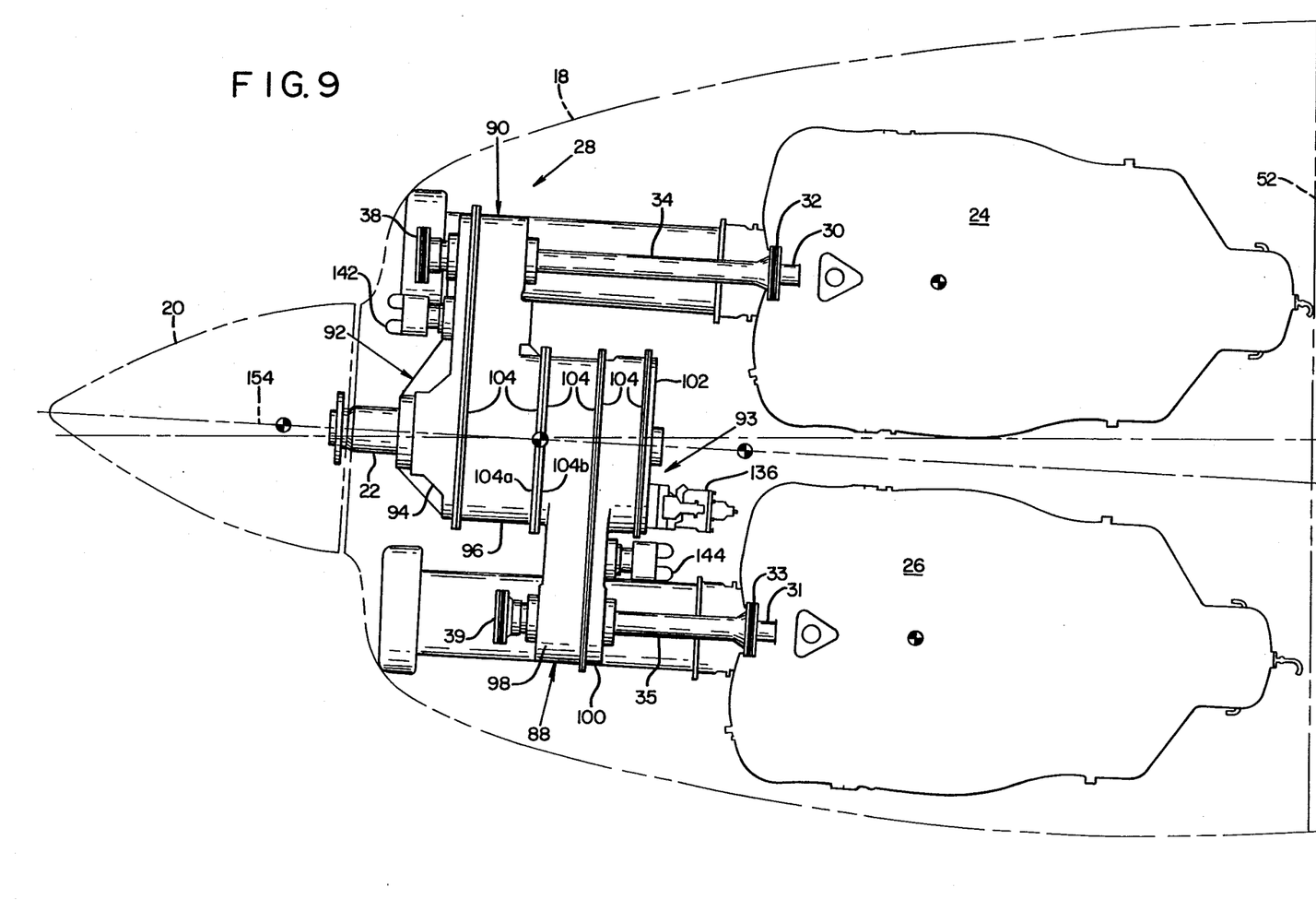
FIG. 9 is a schematic top plan view of the same portion of the aircraft as shown in FIG. 8.

Now referring to FIG. 7, the same Cessna Caravan airplane is shown mounting different engines, this time a pair of Pratt & Whitney PW205B turboshaft engines 24a,26a, but with the same gearbox 28 as shown in FIG. 6. Because the output shafts of the Pratt & Whitney engines are lower on their engine profiles than are the output shafts of the Allison engines of FIG. 6, adjustment of the two power train sections 88,90 of gearbox 28 is required to align input shafts 34,35 with such output shafts. More specifically, power train sections 88,90 must be rotated about their mating circular flanges 104a,104b (FIGS. 5,8, and 9) about the axis 154 of the propeller shaft until the gearbox input shafts 34,35 are in alignment with the engine output shafts. When this is done, the two gearbox power train sections 88,90 assume the downwardly angular configuration shown in FIG. 7 in which the axes of the gearbox input shafts are positioned substantially below the axis 154 of the propeller shaft and are spaced closer together than the gearbox input shafts in FIG. 6.

In practice, a given gearbox of the described design would normally be adjusted at the factory to accommodate a particular aircraft, engine and engine mounting configuration so that no field adjustment would be required. With respect to different engine combinations, it is not necessary, for example, that the two engines be symmetrical, that is, of the same make, type, and power output. With the present gearbox design, the two engines could be of different makes, profiles and power outputs. Using engines of different power outputs, the high power engine or both engines could be used for high power requirements, such as on takeoff, and the low power engine could be used for cruising or backup.

Lubrication System

Figure 10:
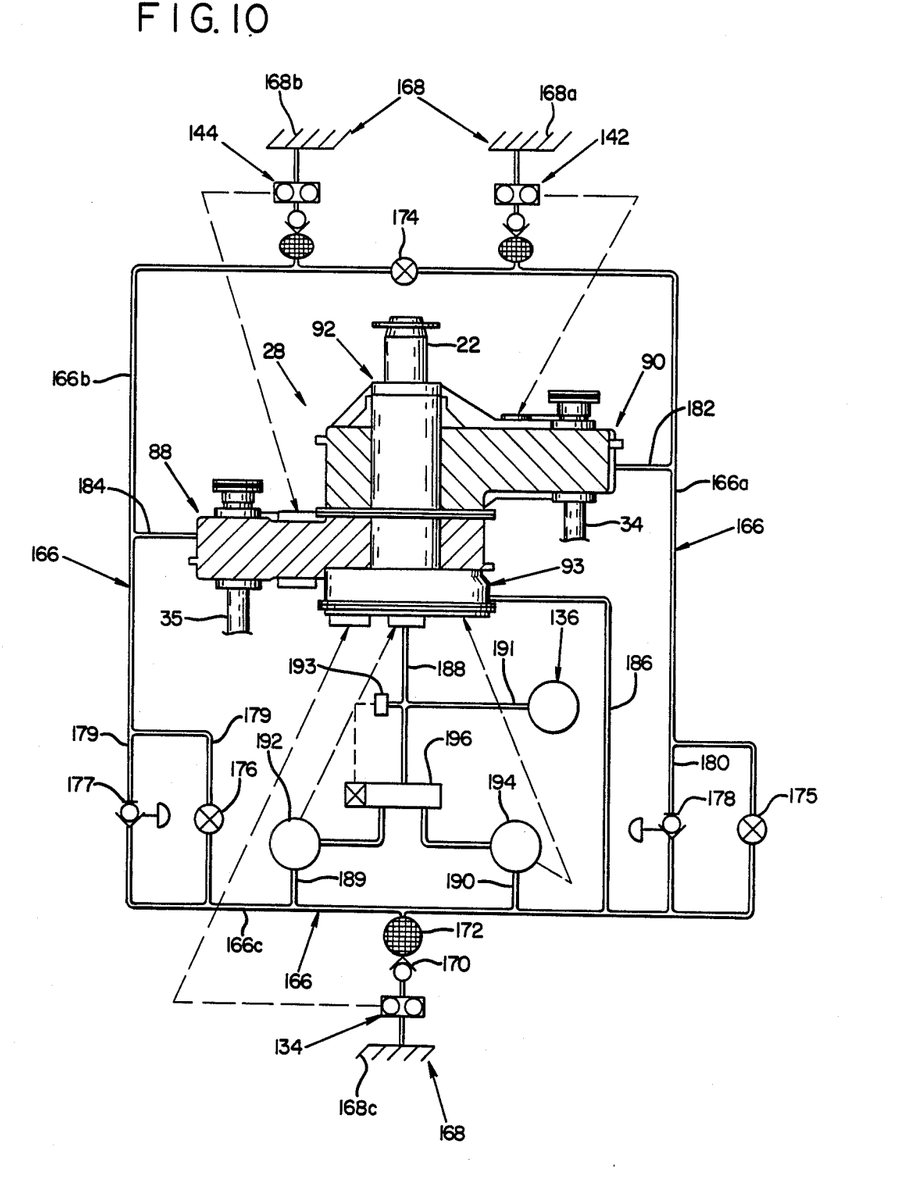
FIG. 10 is a schematic diagram of the oil system for the gearbox of FIG. 3.

FIG. 10 is a diagram of the lubrication system for the gearbox, emphasizing its built-in redundancies which particularly adapt it for aircraft use. The oil feed circuit includes a common feed line 166 into which the idler gear-driven starboard and port oil pumps 142,144 feed oil from separate compartments 168a,168b of a common reservoir 168. The propeller shaft-driven oil pump 134 also feeds oil into the circuit from another separate compartment 168c of the same common reservoir 168. Each oil pump includes a check valve 170 and oil filter 172, shown with respect to oil pump 134.

Normally closed solenoid-operated valves 174,175,176 in line 166 and normally closed low pressure-operated one-way valves 177,178 in bypass lines 179,180 divide the common oil feed line into three normally isolated subcircuits including a first subcircuit 166a feeding oil into input gearbox section 90 through a feed line 182 from starboard oil pump 142. A second subcircuit 166b feeds oil into the port gearbox input section 88 through a feed line 184 from port oil pump 144.

A third subcircuit 166c of primary circuit 166 feeds oil into the auxiliary gearbox and propeller shaft section 92 of the gearbox through feed lines 186,188 from propeller shaft-driven oil pump 134. More particularly, pump 134 feeds oil through line 186 into the auxiliary gearbox section 93 to lubricate auxiliary gear train 110 (FIG. 5) and its bearings. Pump 134 also pumps oil through one of branch feed lines 189,190 and through an operating one of two selectively operable propeller speed governors 192,194 and a shuttle valve 196 into propeller shaft feed line 188 to lubricate the propeller shaft bearings. Overspeed governor 136 is also supplied with oil from feed line 188 through a branch feed line 191. Shuttle valve 196 is a three-way, two-position valve that is solenoid operated from an oil pressure-activated switch 193 in feed line 188. Under normal oil pressure, switch 193 is open, and oil from pump 134 is supplied through primary governor 192 to feed line 188. Under abnormally high oil pressure such as would result from primary governor 192 being stuck in its open or bypass position, pressure switch 193 closes to activate solenoid valve 196, shifting such valve to a position to deactivate governor 192 and activate backup governor 194.

The described lubrication system operates as follows during various possible failure modes:

If either of the gear train-driven oil pumps 142,144 fails during dual engine operation, the affected gear train may be deactivated by shutting down the associated engine. Alternatively, the gear train associated with the failed pump may be lubricated by manually switching to either the other operating gear train-driven pump or by manually switching to the propeller shaft-driven pump. For example, if starboard pump 142 fails, the pilot can use pump 144 to lubricate gearbox section 90 by opening solenoid valve 174. Pump 144 has sufficient capacity to supply oil under operating pressure to both gearbox power train sections 88,90 for this purpose. Alternatively, by opening solenoid valve 175, propeller shaft-driven pump 134 can be used to supply oil under required pressure to gearbox section 90 while continuing to lubricate the propeller shaft and auxiliary gear train.

If a crack occurs in one of the two gearbox input sections 88,90, the associated oil pump would eventually pump approximately one-fourth of the oil from the partitioned oil reservoir 168. Under such circumstances, the pilot should shut down the engine on the affected side of the gearbox.

Failure of the internal propeller shaft seals is not likely because the pressure differential across such seals is virtually zero in the multi-path oil system provided for the propeller shaft. However, if excess leakage should occur in the propeller shaft seals, the oil would simply run into the common reservoir 168 requiring no corrective action.

If the propeller shaft-driven oil pump 134 should fail, the drop in oil pressure in feed line 188 will automatically open one or both of valves 177,178 in bypass lines 179,180, depending on whether one or both of pumps 144,142 are operating. The operating pump(s) 142,144 will supply oil under operating pressure through the open bypass line(s) 179,180 to the propeller shaft bearings and auxiliary gear train.

If primary propeller governor 192 should fail by being stuck in its open or bypass mode, the propeller would tend to feather. To prevent this, pressure-operated switch 193 activates the solenoid of shuttle valve 196 to shift such valve to a position to activate the back-up propeller governor 194.

If one of the two propeller governors 192,194 should fail on the high pressure side, the propeller will try to overspeed. In this situation, the overspeed governor 136 prevents propeller runaway. Additionally, the pilot should manually switch from the primary governor 192 to the backup governor 194 through remote activation of shuttle valve 196.

If one engine should cut out during takeoff, the other, operating engine slows down, causing the primary propeller governor 192 to increase propeller oil pressure and therefore reduce propeller pitch. No pilot action is required.

Operation

Operation of the dual engine-single final drive system will be described with respect to its application to the single propeller-driven fixed wing aircraft shown. However, it should be understood that the drive system also has application to multiple propeller-driven aircraft and to applications other than aircraft such as for driving the propeller shaft of a ship or the final drive shafts of other apparatus. Nevertheless, because of the redundancies and other safety features built into the described drive system, it is especially suitable for fixed wing aircraft applications.

During operation of both engines, the engine output shafts 30,31 drive gearbox input shafts 34,35, respectively, through flexible couplings 32,33. Input shafts 34,35 in turn transmit torque through their respective flexible couplings 38,39 to the hollow pinion shafts 114 in the power train sections 90,88 of the gearbox.

Pinion shafts 114 transmit driving torque through their respective pinion gears 112 and idler gears 116 to their respective drive gears 120,122 on propeller shaft 22. If output gears 120,122 are driven by their respective engines at speeds at least matching the speed of rotation of propeller shaft 22, the output gears drivingly engage and rotate the propeller shaft through their respective overrunning clutches 124. However, if the propeller shaft should be rotating at a speed greater than the speed at which either one or both of the output gears is driven, the slower gear(s) will free wheel on the propeller shaft. This feature enables the propeller shaft to operate under the power of one engine while the other engine is shut down, or if any portion of the power train of the other engine should become disabled such as through a gear, bearing, or oil pump failure, or otherwise. This feature also enables the propeller shaft to be driven selectively by one or both engines, permitting single engine operation, for example, while cruising.

During operation of both engines, gearbox lubrication is provided by all three oil pumps. Oil pump 142 driven by idler shaft 118 in power train input section 90 lubricates gearbox section 90, including its gear shaft bearings. Oil pump 144 driven by the idler shaft of the other power train section 88 of the gearbox lubricates gearbox section 88 including its various gear shaft bearings. At the same time, auxiliary drive train 110 driven by propeller shaft 122 drives the third oil pump 134 to lubricate the various propeller shaft bearings and operating propeller governor. Oil is supplied to the various oil pumps from the respective partitioned sections of the common oil reservoir to prevent cross contamination of oil between the three gearbox sections.

If during normal dual engine operation, one of the idler shaft-driven oil pumps 142,144 fails, the pilot can manually switch to the other, still operating, idler-driven oil pump to supply both power train sections of the gearbox with oil under required pressure. Alternatively, the pilot can shut down the affected engine. If, on the other hand, the propeller shaft-driven oil pump 132 fails during normal operation, pressure-actuated valves in the oil circuit open automatically so that idler-driven pumps 142,144 supply oil under suitable pressure to the propeller shaft bearings and auxiliary drive train to prevent disablement of the aircraft.

The dual engine drive system disclosed is designed with the redundancy, reliability, and versatility necessary for certification and installation in fixed wing aircraft of many different configurations and for a wide variety of aircraft applications, including:

1. dual engine, single propeller-driven airplanes;
2. wing-mounted, multi-propeller-driven airplanes;
3. airplanes and engines of many different makes, models and configurations and having a wide variety of power requirements;
4. applications in which the dual engines have or require different power ratings; and
5. aircraft using either tractor- or pusher-type propellers.

As previously noted, it is also expected that the system described will be certified for use in carrying commercial passengers in single propeller-driven fixed wing aircraft.

For typical existing fixed-wing, single-propeller airplanes, the system may be designed, fox example, with a nominal continuous output torque of 3750 ft./lbs. Typically, the engine input to the gearbox would be at approximately 6,000 RPM whereas the nominal output speed of the propeller shaft from the gearbox would be at approximately 2,000 RPM. However, the gearbox would have the capability of varying output speed between about 1,700 RPM up to about 2,400 RPM simply by changing the size of the idler gears. The system described may be operated with a feathering, reversible type propeller.

The provision of the input drive shafts extending through the hollow gearbox pinion shafts provides drive shaft containment in the event of coupling failure and reduces the required distance between gearbox input and engine output to better accommodate drive line shaft misalignment.

As for the engine-gearbox truss-type mounting frame, the frame is designed to allow passage of the engine inlet ducts therethrough. Brackets (not shown) to support two independent oil coolers and the common oil tank may be hung from the forward support struts of the support frame. Thus, the disclosed drive system may be easily removable from the aircraft as a unit, complete with the lubrication and air induction system, simply by releasing the six resilient mounts and any quick connectors for fuel and electrical supplies.

Summarizing the desired features of the system especially for aircraft applications, two independent propeller-power turbine governors are provided, both driven from the propeller shaft, in addition to an overspeed governor driven from the propeller shaft to prevent propeller runaway should the propeller-power turbine governors malfunction. The system also includes at least two sources of oil pressure for the system, at least one of which is driven from the propeller shaft itself. The propeller shaft-power turbine governors and at least one of the oil pumps are mounted to the rear face of the gearbox. They are driven from the propeller shaft, and both governors are accessible to independently redundant oil supplies.

For turbine engine applications, the compressor inlets for both engines preferably face forward, and the exhaust system includes an exhaust duct stub for each engine directed downward and rearward.

Having illustrated and described the principles of my invention by what is presently a preferred embodiment, it should be apparent to persons skilled in the art that such embodiment may be modified in arrangement and detail without departing from such principles. I claim as my invention the preferred embodiment and all such modifications and equivalents as come within the true spirit and scope of the following claims.

I claim:

1. A multiple engine drive system for driving a single drive shaft, comprising:
   multiple input shafts, each drivingly coupled to an output shaft of a different engine;
   a common final drive shaft;
   separate gear train means for drivingly coupling each of said multiple input shafts to said common final drive shaft;
   each said separate gear train means including a separate input gear on an associated said input shaft and a separate output gear on said common final drive shaft, and separate coupling means for coupling each said output gear to said common final drive shaft;
   said coupling means comprising a separate clutch means operable to drivingly couple each said output gear to said common final drive shaft when each said output gear is driven by its associated said input gear at a speed at least as great as that of said common final drive shaft.

2. Apparatus according to claim 1 wherein said input shafts, separate gear train means, and common final drive shaft are rotatably mounted in a common gearbox housing.

3. Apparatus according to claim 2 wherein said common gearbox housing includes multiple primary gear train housing sections corresponding to the number of said input shafts.

4. Apparatus according to claim 3 wherein said primary gear train housing sections are offset from each other in a direction axially of said common final drive shaft.

5. Apparatus according to claim 4 wherein said primary gear train housing sections are rotatable relative to one another about the axis of said common final drive shaft such that the positions of said input shafts relative to each other and relative to said common final drive shaft can be changed, and such that the distance between said input shafts can be changed.

6. Apparatus according to claim 3 wherein said primary gear train housing sections are positioned in axially adjacent relationship along said common final drive shaft, said sections including mating circular flange portions, said mating flange portions being joinable at variable annular positions relative to one another such that the positions of said input shafts relative to each other and relative to said common final drive shaft can be varied.

7. Apparatus according to claim 1 wherein said multiple input shafts comprise a pair of input shafts extending into said gearbox along input axes on opposite sides of a vertical plane through the axis of said common final drive shaft.

8. Apparatus according to claim 7 wherein said common final drive shaft is a propeller shaft.

9. Apparatus according to claim 8 wherein said propeller shaft is an aircraft propeller shaft.

10. Apparatus according to claim 7 wherein said input shafts are coupled to the output shafts of a pair of turboshaft gas turbine engines.

11. Apparatus according to claim 1 wherein each said separate gear train means includes an idler gear between said input and output gears for transmitting torque from said input shaft to said common final drive shaft.

12. Apparatus according to claim 11 wherein said input gear is a pinion gear on a hollow pinion shaft and wherein an associated said input shaft extends lengthwise through said pinion shaft, and drive coupling means flexibly coupling said input shaft to said pinion shaft at the free end of said input shaft.

13. Apparatus according to claim 11 wherein the idler gear of each gear train means includes an idler shaft driving an oil pump.

14. Apparatus according to claim 13 wherein said common final drive shaft is a propeller shaft, and said propeller shaft drives an auxiliary drive train means, said auxiliary drive train means driving a propeller speed governor means, an overspeed governor means, and an oil pump.

15. Apparatus according to claim 14, including bearing means within a gearbox housing and rotatably mounting said propeller shaft, said bearing means including multiple angular thrust bearing means and a backup thrust bearing means cooperable with an auxiliary gear to resist axial thrust of said propeller shaft in the event of failure of said multiple angular thrust bearing means.

16. Apparatus according to claim 14 wherein the oil pumps driven by said idler shafts normally lubricate their respective primary gear train gearbox sections and said oil pump driven from said auxiliary drive train means lubricates said propeller shaft and auxiliary drive train means.

17. Apparatus according to claim 16 wherein the multiple said oil pumps are in a common oil circuit normally subdivided into separate and independent subcircuits, and means operable to supply oil under required pressure from one subcircuit to another subcircuit when an oil pump fails in the other subcircuit.

18. A dual engine drive system for driving a single aircraft propeller shaft for an aircraft, comprising:
   a pair of engines each including an engine output shaft,
   a single gearbox,
   a pair of gearbox input drive shafts, each coupled to one of said engine output shafts,
   a single propeller shaft rotatably mounted within said gearbox,
   a pair of gear train means within said gearbox, one for drivingly connecting each said input shaft to said propeller shaft, each of said pair of gear train means including a separate output drive gear on said propeller shaft and separate clutch means operable to drivingly couple said output gear to said propeller shaft only when said output drive gear is driven by its associated engine at a speed at least as great as the speed of said propeller shaft,
   and a truss-type support frame for supporting said engines and gearbox as a unit on said aircraft, comprising:

a generally annular rigid frame ring extending in a plane generally normal to the axis of said propeller shaft, multiple gearbox truss strut means extending forwardly from rigid connections with said frame ring and having mounting means at the forward ends thereof for mounting said gearbox to said frame ring, multiple engine truss strut means extending rearwardly from rigid connections with said frame ring and having mounting means at the rearward ends thereof for mounting said engines to said frame ring, said gearbox and engine truss strut means mounting said engine in generally side-by-side relationship with the axes of said engine output shafts on opposite sides of the axis of said propeller shaft, and means on said frame ring for resiliently mounting said frame ring to support structure of said aircraft, whereby said engines and gearbox are resiliently mounted as a unit to said support structure.

19. Apparatus according to claim 18 wherein said engines are turboshaft gas turbine engines.

20. Apparatus according to claim 18 wherein said gearbox input shafts are flexibly coupled to their respective gear train means.

21. A torque-combining gearbox for use in a dual engine drive system for driving a single propeller shaft, said gearbox comprising:

a first gearbox section rotatably mounting a single propeller shaft in bearing means, including thrust bearing means, a second gearbox section including a first primary gear train including an input gear for receiving power from a first input shaft and an output gear connected to said propeller shaft by a first overrunning clutch means, a third gearbox section including a second primary gear train including an input gear for receiving power from a second input shaft and an output gear coupled to said propeller shaft by a second overrunning clutch means, said first gearbox section including an auxiliary gear train means driven by said propeller shaft, said first and second primary gear train means and said auxiliary gear train means driving separate oil pumps for lubricating their respective gearbox sections.

22. Apparatus according to claim 21 wherein said separate gearbox sections are sealed from one another to prevent the cross flow of oil therebetween, and backup means operable to enable the oil pump of one gearbox section to supply oil to another gearbox section under operating pressure while also supplying oil to said one section upon the failure of the oil pump in the other section.

23. Apparatus according to claim 22 wherein said backup means is automatically operable upon a failure of the oil pump in said first gearbox section to supply oil from the oil pump in at least one of said second and third gearbox sections.

24. Apparatus according to claim 21 wherein said first gearbox section includes a primary propeller speed governor means, a secondary propeller speed governor means, and an overspeed governor means, all three means responsive to oil pressure in said first gearbox section for automatically activating said secondary speed governor means upon a malfunction of said primary speed governor means.

25. Apparatus according to claim 21 wherein said second gearbox section includes an idler gear in said first primary gear train between said input gear and said output gear for driving one of said separate oil pumps, and said third gearbox section includes a second idler gear in the second primary gear train between the input gear and the output gear of the second primary gear train for driving another of the separate oil pumps.

26. The apparatus of claim 21 wherein the thrust bearing means of the first gearbox section includes primary thrust bearing means rotatably mounting the single propeller shaft and backup thrust bearing means operable to resist axial thrust of the propeller shaft upon failure of the primary thrust bearing means.

27. A torque-combining gearbox for use in a dual engine drive system for driving a single propeller shaft, said gearbox comprising:

a first gearbox section rotatably mounting a single propeller shaft in bearing means, including thrust bearing means, a second gearbox section including a first primary gear train including a first input gear for receiving power from a first input shaft and a first output gear connected to said propeller shaft by a first overrunning clutch means, and a third gearbox section including a second primary gear train including a second input gear for receiving power from a second input shaft and a second output gear coupled to said propeller shaft by a second overrunning clutch means.

* * * * *

UNITED STATES PATENT AND TRADEMARK OFFICE
CERTIFICATE OF CORRECTION

PATENT NO. : 4,829,850

DATED : May 16, 1989

INVENTOR(S) : Joe I. Soloy

It is certified that error appears in the above-identified patent and that said Letters Patent is hereby corrected as shown below:

In the Claims:

Column 13, line 17, the word --final-- should be inserted between the words "single" and "drive".

Signed and Sealed this

Thirty-first Day of July, 1990

Attest:

HARRY F. MANBECK, JR.

*Attesting Officer*   *Commissioner of Patents and Trademarks*